United States Patent [19]

Frazee, Jr. et al.

[11] Patent Number: 4,957,526
[45] Date of Patent: Sep. 18, 1990

[54] OPTICAL FIBER COATING CONTROL PROCESS

[75] Inventors: Ralph E. Frazee, Jr., Bricktown; David H. Smithgall, Sr., East Windsor, both of N.J.

[73] Assignee: AT&T Bell Laboratories, Murray Hill, N.J.

[21] Appl. No.: 381,375

[22] Filed: Jun. 2, 1989

[51] Int. Cl.$^5$ .................. C03B 37/07; C03C 25/02
[52] U.S. Cl. ................................ 65/3.11; 65/3.12; 356/73.1; 356/381; 427/10
[58] Field of Search .................. 65/3.11, 1, 2, 3.12, 65/11.1; 356/73.1, 381, 384; 250/550, 560; 358/101; 427/10, 163, 166, 167; 118/672

[56] References Cited
U.S. PATENT DOCUMENTS

4,027,977 6/1977 Frazee et al. ................ 356/111
4,210,931 7/1980 Bachman et al. .............. 65/3.12

Primary Examiner—Peter Kratz
Attorney, Agent, or Firm—Roderick B. Anderson

[57] ABSTRACT

In accordance with the invention, the functions of two TV cameras in the prior art for monitoring polymer coating concentricity and/or carbon coating thickness are accomplished by a single TV camera (48). Rather than being projected onto an opaque dispersive screen, the forward-scattered mode pattern of each of the orthogonal beams (57,58) is transmitted through a translucent screen (52,53) and reflected to an image combining device (67) which transmits both patterns to the single TV camera (48). The two beams are slightly vertically displaced to establish displaced images (72,73) of the two patterns. This allows the two patterns to be viewed simultaneously and distinguished by the TV camera. Modified electronics (FIG. 10) provide for alternate TV scanning of the two images so that a computer (22) can monitor and correct concentricity and/or carbon coating thickness in real time during fiber production.

21 Claims, 5 Drawing Sheets

OPTICAL FIBER COATING CONTROL PROCESS

TECHNICAL FIELD

This invention relates to methods for making optical fibers and, more particularly, to methods for controlling optical fiber coatings during optical fiber fabrication.

BACKGROUND OF THE INVENTION

Primarily because of their use in optical communications systems, the fabrication of optical fibers has been a subject of intensive research and development. Optical fibers are typically made in a continuous process which involves drawing a thin glass strand or fiber from a heat-softened glass preform, and thereafter coating it with a polymer to increase its structural strength. The Andrejco et al., U.S. Pat. No. 4,450,333, assigned to AT&T Technologies, Inc., hereby incorporated herein by reference, describes in detail a furnace of the type that can be used to melt a glass preform to permit a fiber to be drawn.

The paper of Smithgall and Frazee, "High Speed Measurement and Control of Fiber-Coating Concentricity", the *Bell System Technical Journal*, Vol. 60, No. 9, Nov. 1981, pp. 2065–2080, incorporated by reference herein, describes a method for monitoring the concentricity of the optical fiber polymer coating by directing orthogonal light beams at the coated fiber. Each of the beams impinging on the fiber results in a pattern of forward-scattered light modes that are projected on orthogonally constructed screens. Two television cameras are used to detect these patterns projected on the screens, and more specifically, to detect asymmetries in the light distribution which indicates a deviation from concentricity of the polymer coating. Thus, each of the television cameras generates signals indicative of any deviation from concentricity which are in turn used to make concentricity adjustments.

The Frazee et al., copending patent application Ser. No. 316,192, filed Feb. 27, 1989, hereby incorporated by reference herein, describes a method for making, between the glass portion of the optical fiber and the polymer coating, a thin carbon coating which can hermetically seal the glass optical fiber to increase its structural strength and its resistance to environmental contaminants. The Frazee et al. patent application further describes a method for monitoring the thickness of the carbon coating by using the same orthogonal optical beam arrangement as described in the Smithgall et al. paper. However, as described in the Frazee et al. application, the carbon coating thickness is related to forward-scattered mode intensity. As a consequence, the strength of the signals generated by the two television cameras may be used to provide an indication of absolute light mode intensity. If the intensity falls outside of prescribed ranges, the signals are used to adjust automatically the thickness of the applied carbon coating so as to maintain it within a prescribed range of thicknesses. Thus, the signals from the two television cameras are used to make both polymer coating concentricity adjustments and carbon coating thickness adjustments in real time during the optical fiber fabrication.

While the cost of finished usable optical fiber has fallen dramatically in the last five years, continuing efforts are being made to reduce the cost further. Worldwide competition in this technology is extremely vigorous, and it is clear that any improvement that will reduce the cost of making the finished product without sacrificing quality wil be diligently pursued.

SUMMARY OF THE INVENTION

In accordance with the invention, the functions of the two TV cameras in monitoring polymer coating concentricity and/or carbon coating thickness are accomplished by a single TV camera. Rather than being projected onto an opaque dispersive screen, the forward-scattered mode patterns of each of the orthogonal beams is transmitted through a translucent screen and reflected to an image combining device which transmits both patterns to the single TV camera. The two beams are slightly vertically displaced so as to establish displaced images of the two patterns. This allows the two patterns to be viewed simultaneously and distinguished by the TV camera. Modified electronics, as will be described in more detail below, provide for alternate TV scanning of the two images so that a computer can monitor and correct concentricity and/or carbon coating thickness in real time during fiber production.

These and other objects, features and advantages of the invention will be better understood from a consideration of the following detailed description taken in conjunction with the accompanying drawing.

DETAILED DESCRIPTION

Figure 1:
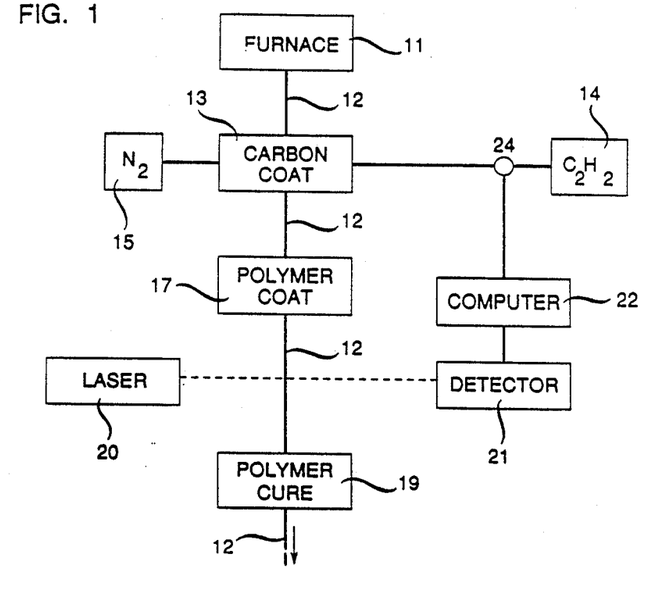
FIG. 1 is a schematic block diagram of apparatus for fabricating optical fibers in which the invention may be used.

Referring now to FIG. 1, there is shown, as a functional block diagram, apparatus for fabricating optical fiber in which the invention may be used. A draw tower in which the apparatus is used typically includes a furnace 11 into which a glass preform (not shown) is fed and from which an optical fiber 12 is drawn. The furnace may be of the general type described in the aforementioned patent of Andrejco et al., and may produce a temperature on the order 2300° C. which softens or partially melts the preform and which permits a glass fiber 12, typically 125 microns in diameter, to be drawn from the softened preform at a rate typically between two and ten meters per second. Experimental work shows that optical fibers may also be drawn from preforms of polymer. In any event, the invention is intended to be used in an environment in which an optical fiber of a plastic material is drawn from a preform, where glass shall be considered as one example of a plastic material.

As described in the aforementioned Frazee et al. patent application, the heated fiber may be directed through a carbon coating chamber 13 in which it is subjected to a carbon-containing gas. For example, acetylene ($C_2H_2$) from a source 14 may be fed into the coating chamber along with nitrogen from a source 15. As is described in more detail in the DiMarcello et al., copending patent application Ser. No. 098,253, filed Sept. 18, 1987, and assigned to Bell Telephone Laboratories, Inc., the object of the coating process is to deposit carbon on the optical fiber that is chemically bonded with silicon atoms of the glass fiber 12 and which produces a cross-linked carbon network having unsaturated bonds. The flow of the acetylene into the coating chamber 13 is preferably adjusted such that carbon coats on the optical fiber to a thickness of 500 to 1000 angstroms (0.05–0.1 microns). A typical acetylene flow rate is 3.5 liters per minute with a nitrogen flow of 2 liters per minute.

After the carbon coat, the fiber 12 is directed to a polymer coating applicator 17, which coats it in a known manner with a polymer such as a U-V curable acrylate. The diameter of the fiber with the polymer coating is typically 250 microns. Thereafter, the fiber is directed through a polymer curing station 19 which directs the output of ultraviolet lamps having a power adequate to cure the coating material on the fiber 12.

Prior to or after curing the polymer coating, orthogonal beams 20 from a laser, or other collimated light source, are directed transversely at optical fiber 12, and the forward-scattered light is detected by a light detectors 21. The outputs of the detectors are directed to a computer 22 which is connected to the polymer coating applicator 17 to control the concentricity of the polymer coat on the optical fiber 12 and also to a valve 24 for controlling the flow of acetylene to the coating chamber 13 to control the thickness of the carbon coated on the optical fiber.

Figure 2:
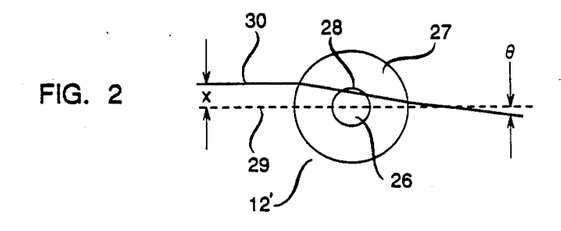
FIG. 2 is a schematic view of a laser ray passing through a section of optical fiber which illustrates certain aspects of the invention.
Figure 3:
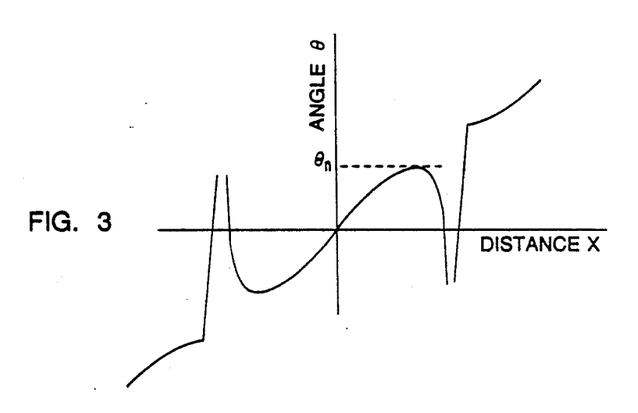
FIG. 3 is a graph of scattering angle $\theta$ of FIG. 2 versus distance x of the ray of FIG. 2 from a center line of the fiber.
Figure 4:
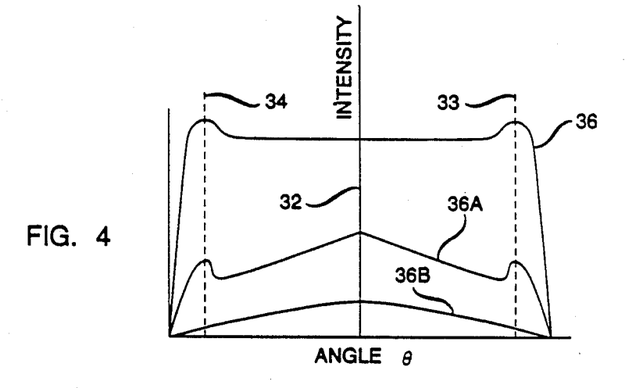
FIG. 4 is a graph of intensity of light passing transversely through an optical fiber versus the scattering angle $\theta$.

FIGS. 2 through 4 are presented as an aid to understanding how forward-scattered light mode patterns can be used to control polymer coating concentricity and carbon coating thickness. In FIG. 2, an optical fiber 12' (shown as a section taken transversely to the fiber's central axis) comprises an inner silica portion 26, an outer polymer portion 27, and a carbon coating 28 between the silica and the polymer portions. Line 29 is a center-line containing the axis of the optical fiber. Consider a pencil light ray 30 parallel to center-line 29 and displaced a distance x from the center-line. It will be scattered due to refraction by the polymer, carbon and silica components and will exit the optical fiber at a scattering angle $\theta$ with respect to the center-line 29.

Referring to FIG. 3, it can be shown that, for light passing transversely through the glass fiber, the scattering angle $\theta$ increases with the distance x until some maximum angle $\theta_n$ is reached. As x increases further, the angle $\theta$ falls as shown in the graph. The same is true of negative values of x, below the center-line, which produce negative angles $-\theta$ and a negative maximum at $-\theta_n$. FIG. 4 shows a graph of the forward-scattered light intensity versus the angle $\theta$. Ordinate 32 represents the point at which the angle $\theta$ equals 0, which corresponds to center-line 29 of FIG. 2, while ordinates 33 and 34 represent the maxima values of $+\theta_n$ and $-\theta_n$, respectively.

Curve 36 illustrates a typical distribution of light intensity versus $\theta$ for an optical fiber in which there is no carbon coating 28 as indicated in FIG. 2. Maximum light intensities are symmetrically disposed about Line 32 at $+\theta_n$ and $-\theta_n$, and the light intensity at all angles is comparatively high. If, in FIG. 2, rather than a laser ray 30 of indefinitely small diameter, we were to consider a collimated light beam having a uniform intensity across its thickness and having a thickness approximately equal to that of the coated optical fiber 12', the total distributed forward-scattered light would correspond to Curve 36 if there were no carbon coating and if the polymer coating 27 were concentric with the silica portion 26.

In the apparatus of FIG. 1, the collimated light beam has a thickness greater than that of the coated fiber. As described in detail in the Smithgall et al. paper, if there is a lack of concentricity of the polymer coating 27 with respect to the silica portion 26, the regions of maximum intensity, regions 33 and 34, will not be symmetrical with respect to center-line 32. The Smithgall et al. paper explains how asymmetries in light intensity at regions 33 and 34 are used to correct automatically the centering of optical fiber 26 within polymer coating 27 of FIG. 2.

As described in the aforementioned Frazee et al. application, the area under Curve 36 is inversely monotonically proportional to the thickness of the carbon layer 28 of FIG. 2. For example, one could take Curve 36 as indicative of a substantially zero carbon coating thickness; Curve 36A of FIG. 4 as a proper carbon coating thickness; and Curve 36B as being indicative of a carbon coating thickness that is too thick. In the FIG. 1 embodiment, the computer 22 should be programmed so as to adjust the valve 24 in response to computed integrated light intensity until the total area under a curve such as Curve 36A is of the proper value indicating a desired carbon coating thickness.

Figure 5:
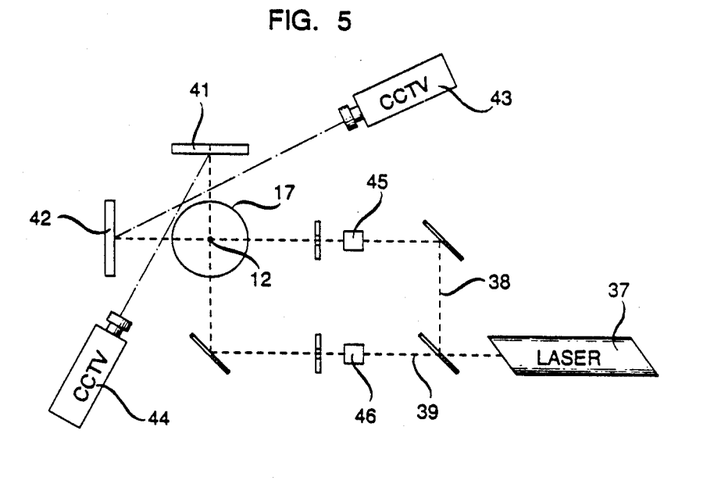
FIG. 5 is a schematic view of apparatus in accordance with the prior art for detecting forward-scattered light modes.

For both of these measurements, it is preferred that two orthogonal beams be used because, for the concentricity measurements, it is important that the optical fiber be properly centered in two dimensions, and for the carbon thickness measurements, it is important that thickness around the entire periphery of the optical fiber be monitored. Moreover, it is preferable that the detecting function shown by detectors 21 be accomplished by the closed circuit television cameras rather than photodetectors. This is illustrated in FIG. 5 in which the output of a laser 37, typically a one milliwatt helium-neon laser, is split into two components 38 and 39 which are each reflected to intersect at the central axis of fiber 12. Located approximately four centimeters from the fiber are viewing screens 41 and 42. The screens may be white bond paper which provides a high contrast background and partially diffuses the scattering pattern, eliminating the fine structure corresponding to interference of refracted and reflected rays. The scattering pattern on screen 42 is viewed by closed circuit television camera (CCTV) 43, and the pattern on screen 41 is viewed by closed circuit television camera 44. By extracting this information from the camera output, the scattering pattern can be reconstructed to give the intensity distribution shown in FIG. 4. The Smithgall et al. publication and the Frazee et al. patent application describe in detail video circuitry that can be used so that the television camera output appropriately drives the computer 22 of FIG. 1.

Figure 6:
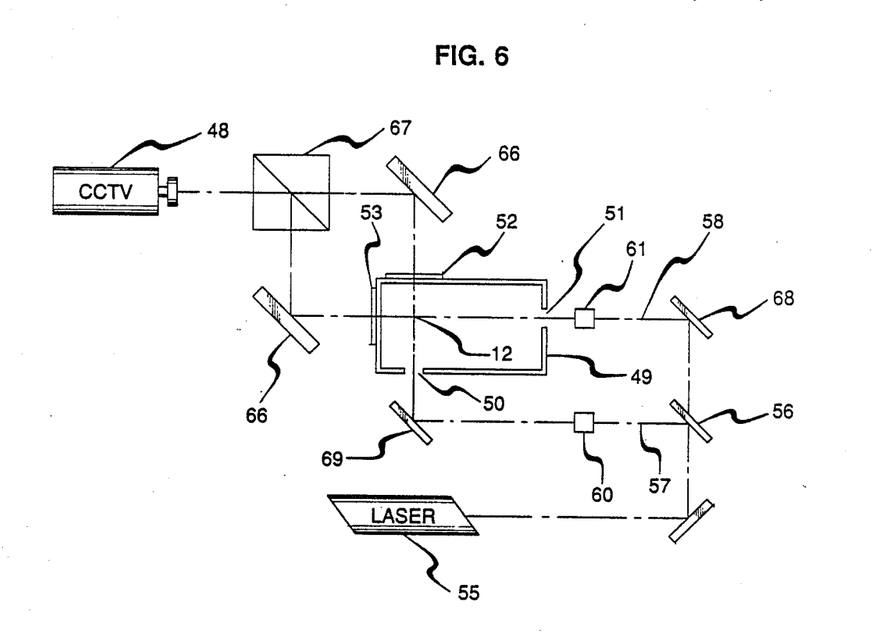
FIG. 6 is a schematic block diagram of apparatus for detecting forward-scattered light in accordance with one embodiment of the present invention.

Referring to FIG. 6, there is shown, in accordance with the invention, an improvement over the prior art in which a single CCTV camera 48 is used in place of the two cameras 42 and 44 of FIG. 5. The assembly of FIG. 6 comprises a structure 49 for defining a pair of openings 50 and 51 and for supporting viewing screen assemblies 52 and 53. A laser beam from a laser 55 is divided by a beam splitter 56 into two light beam components 57 and 58, each being collimated light of somewhat greater thickness than that of the coated fiber 12. The light beam components are directed into unit 49 through openings 50 and 51 so as to impinge on an optical fiber 12 which is shown in horizontal section. As in the previous embodiment, rotatable cubes 60 and 61 permit the beams to be centered on the coated fiber which both maximizes the energy in the light scattered pattern and allows the use of the detected laser signal as an accurate measure for the optical axis.

Figure 7:
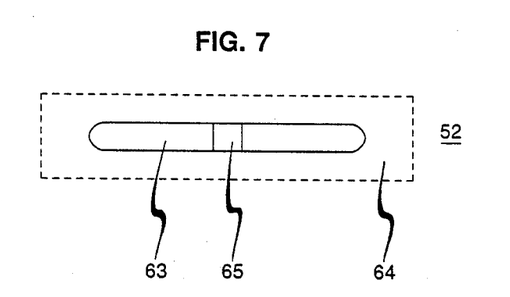
FIG. 7 illustrates in more detail the structure of the viewing screen assemblies of FIG. 6.

The forward-scattered light patterns are projected through translucent viewing screen assemblies 52 and 53, one of which is illustrated schematically in FIG. 7. Each viewing screen assembly comprises a transparent slot 63 and a glass plate 64 backed by translucent paper. In the center of the viewing screen assembly is a filter 65 which is intended to screen out all or part of the unscattered light beam component. The length of the slot 63 limits the viewed angle of the scattered light, preferably to an angle such as ±40° for a fiber located one inch from the screen. The two patterns are directed through the viewing screens 32 and reflected by mirrors 66 to an image combining device 67 which may be a light beam splitter. The combined images are then viewed by the single CCTV camera 48.

Figure 8:
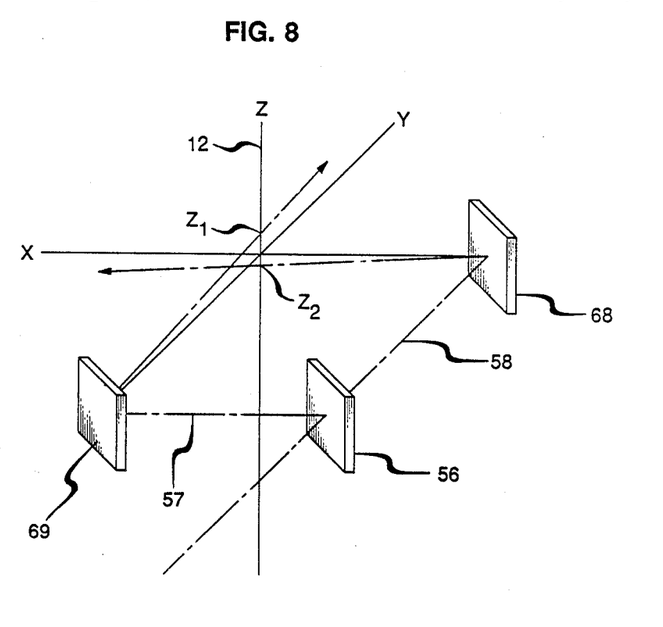
FIG. 8 illustrates schematically optical paths of light beams in the apparatus of FIG. 6.

Displaced images of the two patterns are assured by displacing slightly the two beams 57 and 58 along the axis of the fiber 12. Referring to FIG. 8, this is accomplished by tilting slightly the reflectors 68 and 69 so that beam portion 58 passes slightly under the origin, at $z_2$, of the xyz coordinates, while the beam portion 57 passes slightly above the origin, at $z_1$. The patterns are elongated and transverse to the optic fiber axis and when projected through the viewing screens 52 and 53 are slightly displaced along the z axis. In the embodiment shown, displacement at the location of the viewing screens is ½ inch so that the slot 63 of FIG. 7 is vertically displaced ½ inch in the path of beam 57 with respect to the corresponding slot in the path of beam 58.

Figure 9:
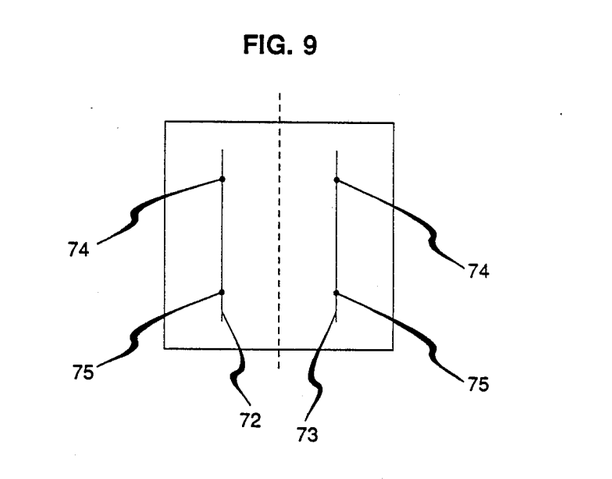
FIG. 9 illustrates images detected by the CCTV camera of the apparatus of FIG. 6.

The camera 48 is rotated ninety degrees with respect to the projected images so that the projected images are displayed on the camera tube face as horizontally displaced images rather than as vertically displaced images. Referring to FIG. 9, the images are projected onto the TV camera as horizontally displaced images or patterns 72 and 73, which are then scanned by the horizontal scan lines of the camera. High intensity locations 74 and 75 correspond to locations 33 and 34 of FIG. 4. In the absence of filter 65 of FIG. 6, there would also be a high intensity region at the center of each pattern representing the unscattered laser light portions. The horizontal separation of the patterns 72 and 73 results directly from the vertical separation of $z_1$ and $z_2$ of FIG. 8.

A single TV camera can conveniently be used to generate information representative of both patterns 72 and 73 by generating information concerning pattern 72 during alternate field scans and information concerning 73 during the remaining alternate field scans. As is known, two successive field scans normally constitute a single frame, so the frame rate of transmission of the two patterns is not changed; rather, resolution is reduced through the use of only one field per frame for each of the patterns rather than two fields per frame. It is also possible to combine the field and line synch pulses to collect two full fields of data—one complete frame—for each pattern, thereby doubling the resolution as may be desired for the concentricity measurement.

Figure 10:
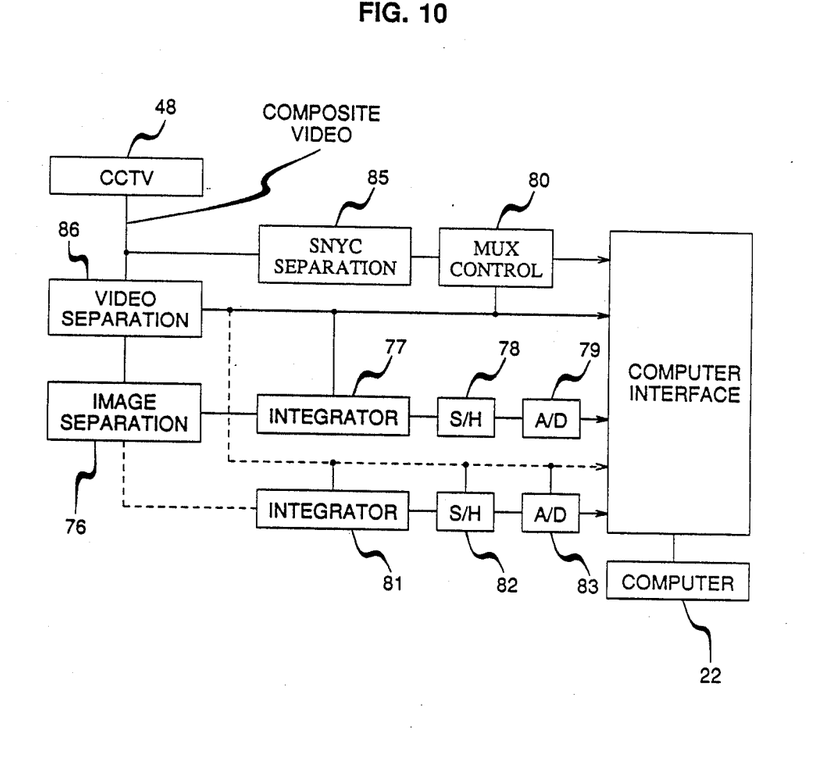
FIG. 10 is a functional block diagram of circuitry that may be connected to the CCTV camera of FIG. 6 and the computer of FIG. 1.

These functions are illustratively accomplished by the video circuitry of FIG. 10, shown in functional block diagram form, in which the output of camera 48 contains the synchronization, frame synchronization, and image or pattern data, all designated as composite video. Synchronous separation circuit 85 removes the image data, and directs field and line synchronization signals to a multiplex control circuit 80. Circuit 80 generates as a multiplexing signal a series of pulses each of a duration of one-half a horizontal scan line that are directed to an image separation circuit 76 to blank half of the image of FIG. 9 during each line scan. A video separation circuit 86 removes field and line synchronization data and transmits the image data to circuit 76. By the alternate blanking of the patterns of FIG. 9, circuit 76 transmits video signals of pattern 72 during alternate frames and signals of pattern 73 during other alternate frames. An integrator circuit 77 sums the signal levels contained in each horizontal scan line. The output is directed to a sample and hold circuit 78 which is controlled by line synchronization pulses to form a serialized box car representation of the intensity envelope which is directed to a high speed analog-to-digital converter 79, which converts the scan line level to eight bits of binary data which are directed to the computer. Each line of the video scan signal may have a duration of approximately 63 microseconds.

Using the signal from the multiplex circuit 80 to separate the data representing each of the signals, the computer 22 stores the signal strength and envelope data. Signal strength information is preferably displayed separately for each channel and is used to center the laser beam on the coated fiber. Coating eccentricity is displayed on a monitor (not shown) and used to control a coating cup position through a stepper motor-driven x-y stage, as is known; is shown simply by the line connecting the computer to the polymer coat functional block 17 shown in FIG. 1. In a somewhat similar manner, the integrated light intensity is measured so as to control the valve 24 of FIG. 1, controlling carbon coating thickness.

With the standard 525 line frame of 33 millisecond duration, each of the patterns is described by a 262 line field, which will normally give sufficient resolution. Alternatively, to avoid sacrifice of resolution, the circuit of FIG. 10 could be modified so that successive fields scan only one pattern, such as pattern 72, and that the next pair of successive fields scan only the other pattern such as pattern 73. This would give a 525 line resolution for each pattern, but would require a 66 millisecond duration for complete frame scan of both patterns.

As a third alternative, the image separation circuit 76 could be designed to transmit half of each scan line to an integrator 81, as shown by the dashed connection line, and the other half of each scan line to integrator 77.

Sample and hold circuit 82 and converter circuit 83 work in the manner as circuits 78 and 79. The signal from circuit 83 would then represent one pattern, such as pattern 72, and the output of circuit 79 would represent the other pattern, such as pattern 73. Rather than blanking half an image, the image separation circuit would, in response to the multiplex circuit 80, switch outputs between integrator 77 and integrator 81 in the middle of each scan line. Each pattern would be represented by a standard 525 line frame having the standard 33 millisecond frame duration. Thus, at the expense of some further hardware, one would get full resolution at the standard frame repetition rate.

In an illustrative embodiment of the invention, the uncoated optical fiber diameter was 125 microns, and the diameter with the polymer coat was 245 microns, both of which are typical dimensions for a coated fiber. The carbon coating had a thickness of 500 to 1000 angstroms (0.05–0.1 microns) and therefore did not significantly affect the overall diameter of the fiber. The principal features shown at 33 and 34 of FIG. 4 appear in the angular range of twenty to thirty degrees as measured from the optical fiber, with fiber eccentricities generating asymmetries of up to thirty-five to forty degrees on either side of the optical axis. The optics package structure 49 shown in FIG. 6 was an enclosed unit four inches high, 24 inches in length and 15 inches in width, with a five inch square opening through which the fiber 12 passes. The fiber 12 was one inch from the viewing screens 52 and 53. A one milliwatt helium-neon laser was used as the laser 55. The aperture or slot 63 of FIG. 7 was two inches by 3/16 inch, and the filter 65 was ¼ inch long. The vertical displacement of the slots of the two viewing screen assemblies was ½ inch. The slot length limited the viewing angle to ±40° for a fiber located one inch from the screen. The filter 65 was a ¼ inch wide piece of blue gelatin filter. The beam splitter 67 was a 50 millimeter cube beam splitter. The CCTV camera was a vidicon of known construction.

While the laser is the most practical device for forming a collimated light beam, in principle, other devices could alternatively be used. It is preferable to screen the non-scattered laser beam so as to obtain a total integrated intensity that is more sensitive to changes in carbon coating thickness. On the other hand, because of the Gaussian distribution of light intensity within most laser beams, if the beam is centered on the fiber, a large proportion of the light intensity will be transmitted through the carbon coating even if the thickness of the beam is significantly larger than the carbon coating diameter; this means that a large proportion of the detected light will be forward-scattered light even if the non-scattered portion is not screened out. While the embodiment described shows a single television camera for making both polymer concentricity and carbon thickness measurements, it could be used for only one such function; i.e., it could be used for only the concentricity function or only for the carbon thickness function. Other modifications and embodiments may be made by those skilled in the art without departing from the spirit and scope of the invention.

We claim:

1. A method for making optical fibers comprising the steps of: drawing a light-guiding fiber from a heated body of a plastic material, coating the fiber, directing two light beams at different angles at the coated fiber, detecting forward-scattered light from the two light beams, analyzing the detected light to generate information, and using the information to modify the coating, characterized in that:

the forward-scattered light is projected through two translucent screens; and light transmitted through the two screens is directed to a light combining device where it is combined for transmission to a single detector, wherein said information is used to control the concentricity of a coating on the fiber and/or the thickness of a coating on the fiber.

2. The method of claim 1 further characterized in that:

the detector is a single closed circuit television camera.

3. The method of claim 2 further characterized in that:

the two light beams are directed substantially orthogonally at the coated fiber, and both light beams are substantially orthogonal with respect to a central axis of the fiber.

4. The method claim 3 further characterized in that:

the two light beams impinge on the optical fiber at slightly different locations along the axis of the optical fiber, thereby displacing forward-scattered light of the two beams.

5. The method of claim 4 further characterized in that:

the television camera output is used to generate a first signal representative only of forward-scattered light from a first one of two light beams;

the television camera output is used to generate a second signal representative of forward-scattered light only from a second one of two light beams.

6. The method of claim 5 further characterized in that:

the first and second signals are used to control of concentricity of a polymer coating on the fiber.

7. The method of claim 5 further characterized in that:

the first and second signals are used to control the thickness of a carbon coating on the fiber.

8. The method of claim 6 further characterized in that:

the symmetries of the first and second signals are measured and the concentricity of the fiber within the plastic coating is adjusted until a predetermined value of signal symmetry is reached.

9. The method of claim 7 further characterized in that:

the intensities of the first and second signals are measured, and the carbon coating thickness is changed until the intensities of the first and second signals are approximately of a predetermined value.

10. The method of claim 6 further characterized in that:

the first and second signals are used to control the thickness of a carbon coating on the fiber.

11. The method of claim 10 further characterized in that:

the symmetries of the first and second signals are measured, and the concentricity of the optical fiber within the plastic coating is adjusted until a predetermined value of concentricity is reached.

12. The method of claim 11 further characterized in that:

the intensities of the first and second signals are measured, and the carbon coating thickness is changed until the intensities of the first and second signals are approximately of a predetermined value.

13. The method of claim 12 further characterized in that:
the heated body of plastic material consists of glass; and the fiber is coated first with a coating of carbon and thereafter with a coating of a polymer material.

14. The method of claim 5 further characterized in that:
the forward-scattered light from the two beams form first and second elongated patterns each having a length dimension orthogonal to the axis of the fiber;
the television camera is oriented so that normally horizontal scan lines of the camera are orthogonal to the first and second patterns, whereby the TV camera scans the first and second patterns successively.

15. The method of claim 14 further characterized in that:
during first alternate field scans of the patterns, signals representing the second pattern are blanked out and during second alternate field scans of the patterns, signals representing the first pattern are blanked out, whereby the first and second signals representing the two patterns can be distinguished.

16. The method of claim 14 further characterized in that:
during the first half of each line scan by the camera, the first signal, representing only the first pattern, is directed from the camera to a first circuit;
during a second half of each scan, the second signal, representative only of the second pattern, is directed to a second circuit.

17. The method of claim 14 further characterized in that:
during first alternate frame scans of the patterns, signals representing the second pattern are blanked out, and during second alternate frame scans of the patterns, signals representing the first pattern are blanked out, whereby signals representing the two patterns can be distinguished.

18. A method for making optical fibers comprising the steps of: drawing an optical fiber from a heated body of a plastic material, coating the optical fiber, directing two light beams at substantially orthogonal angles at the coated fiber, detecting forward-scattered light from the two light beams, analyzing the detected light to generate information, and using the information to modify the coating, characterized in that:
the forward-scattered light of each of the two light beams is reflected toward a light combining device;
and the light combining device is used to combine images of the forward-scattered light from the two light beams and transmit them both to a single detector, wherein said information is used to control the concentricity of a coating on the fiber and/or the thickness of coating on the fiber.

19. The method od claim 18 further characterized in that:
the optical fiber extends in a vertical direction, and the images of the forward-scattered light extend in a horizontal direction;
the single detector is a closed circuit television camera;
and the images are rotated ninety degrees such that horizontal scan lines of the television camera are orthogonal to the predominant direction of the projected images.

20. The method of claim 19 further characterized in that:
the two light beams are caused to impinge on the optical fiber at slightly different vertical locations, thereby creating a displacement of the two images projected to the television camera.

21. The method of claim 20 further characterized in that:
the two light beams are directed substantially orthogonally at the coated fiber;
and both light beams are substantially orthogonal with respect to the central axis of the optical fiber.

* * * * *